(12) United States Patent
George et al.

(10) Patent No.: US 7,184,365 B2
(45) Date of Patent: Feb. 27, 2007

(54) UNITARY MULTI-CABLE TOWING SYSTEM

(75) Inventors: Nicholas Claude George, Sugar Land, TX (US); Rolf Gunnar Molund, Houston, TX (US)

(73) Assignee: PGS Americas, Inc., Houston, TX (US)

( * ) Notice: Subject to any disclaimer, the term of this patent is extended or adjusted under 35 U.S.C. 154(b) by 143 days.

(21) Appl. No.: 10/329,897

(22) Filed: Dec. 26, 2002

(65) Prior Publication Data

US 2004/0125698 A1    Jul. 1, 2004

(51) Int. Cl.
  *G01V 1/38* (2006.01)
(52) U.S. Cl. .......................... 367/20; 367/16; 367/154
(58) Field of Classification Search .................. 367/15, 367/16, 20, 153, 154; 181/110; 114/242–244
  See application file for complete search history.

(56) References Cited

U.S. PATENT DOCUMENTS

| | | | | |
|---|---|---|---|---|
| 2,668,512 A | * | 2/1954 | Klas ........................... 114/243 |
| 3,710,006 A | * | 1/1973 | Davis ....................... 174/101.5 |
| 4,500,980 A | * | 2/1985 | Copeland .................... 367/154 |
| 4,525,813 A | * | 6/1985 | Burrage ........................ 367/20 |
| 4,526,430 A | * | 7/1985 | Williams ..................... 439/152 |
| 4,530,075 A | * | 7/1985 | Pearson ........................ 367/20 |
| 4,756,268 A | * | 7/1988 | Gjestrum et al. ........... 114/242 |
| 5,471,436 A | * | 11/1995 | Harvey ........................ 367/154 |
| 5,673,644 A | * | 10/1997 | Vanasse et al. ............. 114/242 |
| 5,835,450 A | | 11/1998 | Russell |
| 5,913,280 A | * | 6/1999 | Nielsen et al. .............. 114/242 |
| 6,069,841 A | * | 5/2000 | Johnston ....................... 367/20 |
| 6,333,897 B1 | * | 12/2001 | Knudsen et al. .............. 367/20 |
| 6,498,768 B1 | | 12/2002 | Gjestrum et al. |
| 6,631,095 B1 | * | 10/2003 | Bryant et al. ................. 367/20 |
| 2003/0223822 A1 | * | 12/2003 | Oldervoll et al. ........... 405/158 |

FOREIGN PATENT DOCUMENTS

| | | | |
|---|---|---|---|
| GB | 2314627 | | 1/1998 |
| GB | 2339753 | | 2/2000 |
| GB | 2339753 A | * | 2/2000 |
| WO | WO 99/15913 | | 4/1999 |
| WO | WO0026695 | * | 5/2000 |

* cited by examiner

*Primary Examiner*—Jack Keith
*Assistant Examiner*—Scott A. Hughes
(74) *Attorney, Agent, or Firm*—E. Eugene Thigpen; Richard A. Fagin

(57) ABSTRACT

In one aspect the invention comprises a system and a method for marine geophysical exploration, which includes a first cable connected to a vessel and a plurality of streamer cables connected to the first cable. The first cable includes all towing strength members and all electrical power and data transmission conductors for the connected streamer cables.

4 Claims, 18 Drawing Sheets

UNITARY MULTI-CABLE TOWING SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF INVENTION

1. Field of the Invention

This invention generally relates to methods and apparatuses for towing multiple streamer array systems 2. Background One of several conventional techniques for marine seismic surveying is to tow a number of hydrophones behind a vessel over the survey area. Typically, the hydrophones are contained in one or more cables called streamers. Seismic impulses are created and their reflection from the sea bottom and the underlying strata is received by the hydrophones. This data is then used to image the sub-sea strata. Because it is advantageous to extend the hydrophone pattern over a large portion of the survey area, several streamers are towed at the same time.

FIG. 1 illustrates a conventional streamer configuration from an aerial view. Conventional streamer configurations use a vessel 1 to pull streamers 2. Paravanes 3 are used to keep the multiple streamers 2 separated. The paravanes 3 pull various lead in cables 7 and other cables 8 laterally away from the vessel 1. Use of the paravanes and the configuration of the lead-in cables (or spreader cables) 7 and superwide cables 8 enables several streamers 2 to be pulled from a single vessel 1 in a wide pattern. However, the more lead-in 7 and other cables 8 used, the more drag the vessel 1 and the streamers 2 experience. Drag increases fuel and vessel power requirements.

Another drawback of conventional techniques is that to connect the various components of conventional cable configurations, the cables 7, 8, are cut and then spliced together. This includes the stress bearing members, the seismic data conductors, and the electrical power conductors. By cutting and then splicing, the mechanical integrity of the cable is compromised, and the cables become more susceptible to fatigue and/or manufacturing process induced failure. Also, if optical fibers are used for transmitting the data from the sensors to the vessel, each splice will attenuate the signal and will give a substantial loss in signal level.

Thus, there is a long felt need for an improved method and system for towing streamers which increases reliability, reduces components, reduces structural, electrical, and optical splices, and that creates less drag than conventional techniques.

SUMMARY OF INVENTION

In one aspect the invention comprises a system and a method for marine geophysical exploration, which includes a first cable connected to a vessel and a plurality of streamer cables connected to the first cable. The first cable includes all towing strength members and all electrical power and data transmission conductors for the connected streamer cables.

In another aspect the invention comprises a system and a method for marine geophysical exploration in which a vessel tows a first cable that includes at least one strength member and a plurality of electrical power and data conductors. A plurality of streamer cable connection locations are provided on the first cable, and a first connector assembly is affixed to the first cable at a first streamer cable connection location. At least one electrical power conductor and at least one data conductor included in the first cable is connected by means of the first connector assembly to a first streamer cable, and at least one electrical power conductor and at least one data conductor are extended continuously past the first streamer cable connection location to at least a second streamer cable connection location.

DETAILED DESCRIPTION

Figure 1:
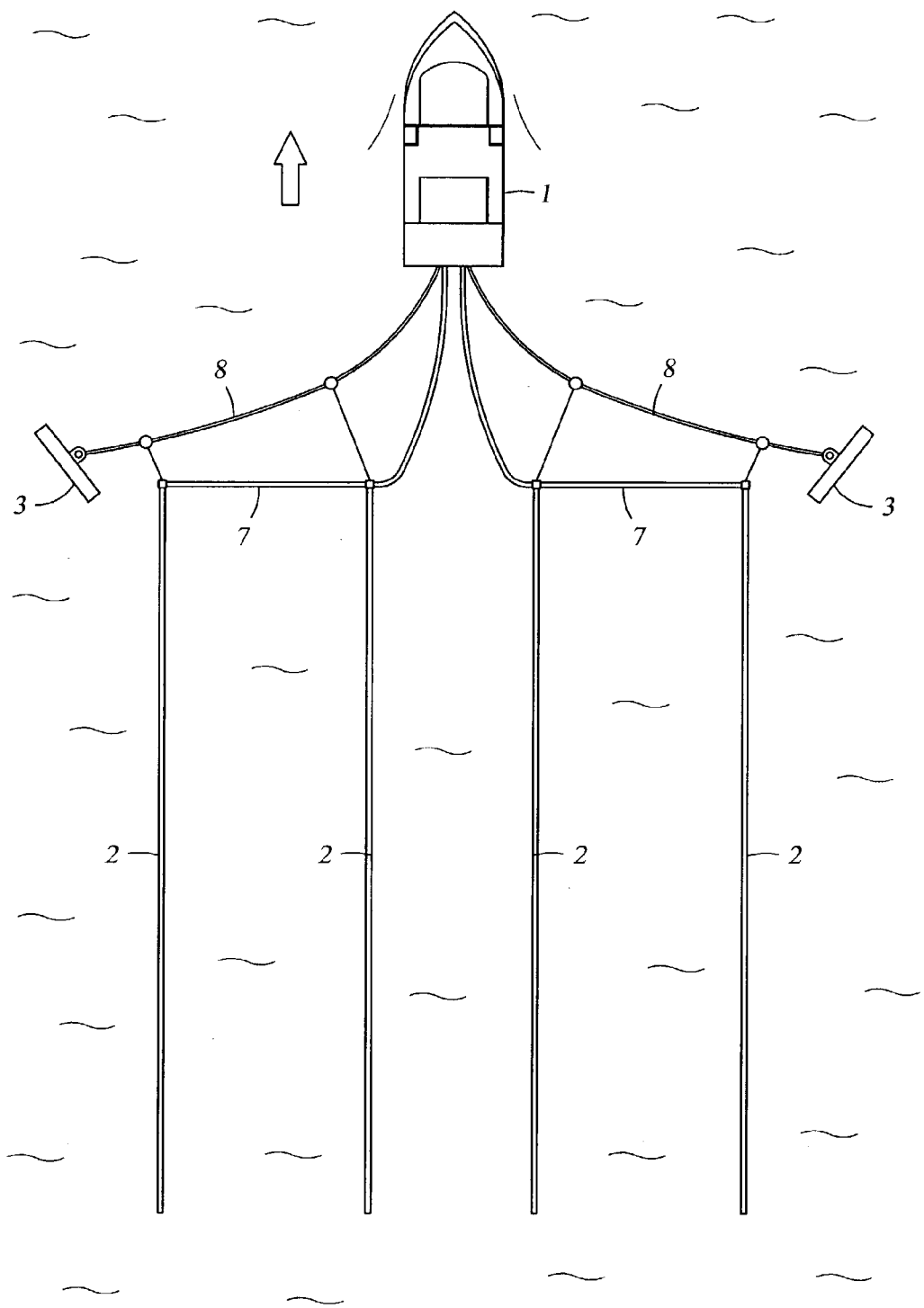
FIG. 1 illustrates a conventional streamer configuration from a top view.
Figure 2:
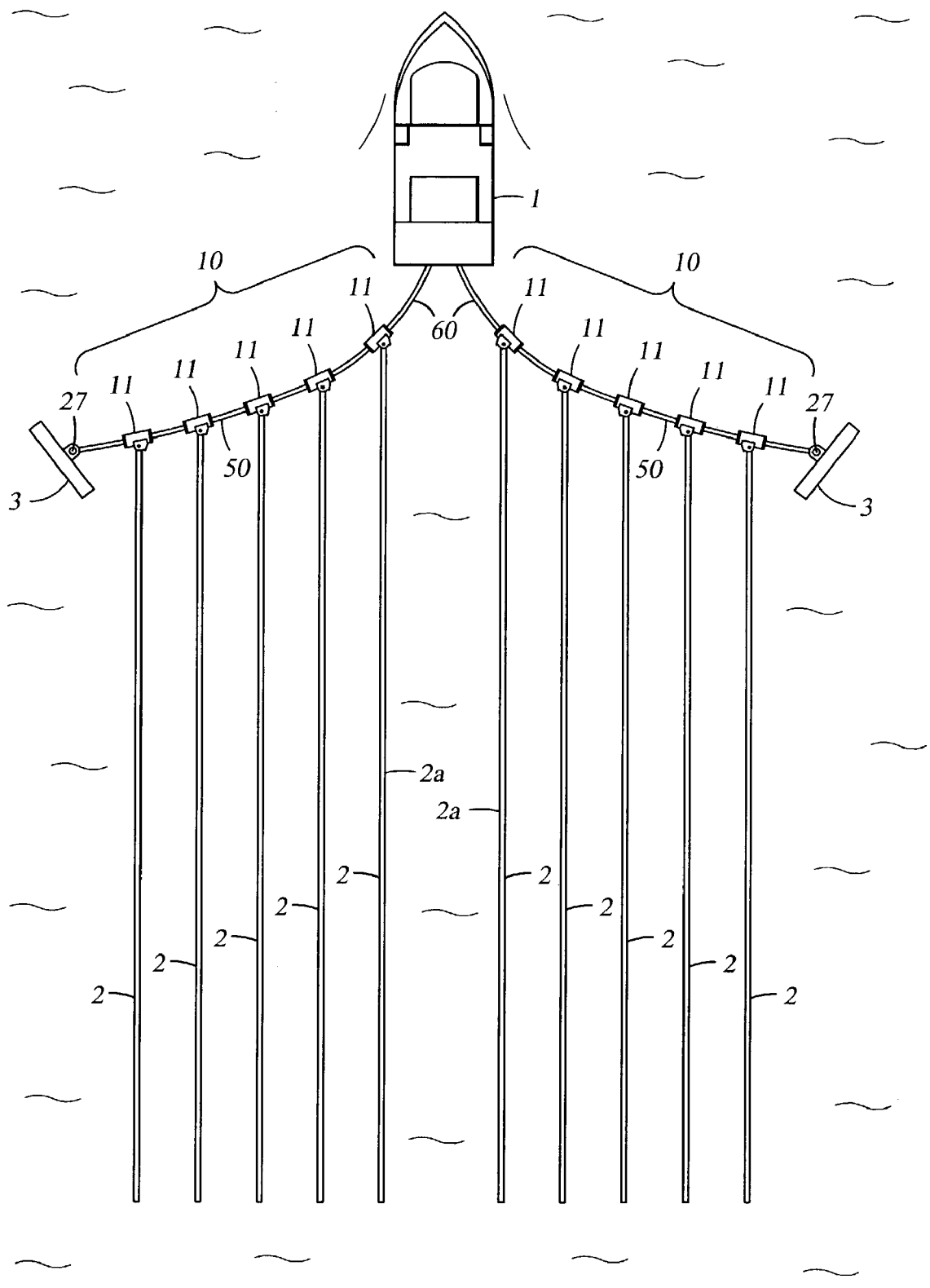
FIG. 2 shows an aerial view of two lead-in and manifold cables of the present invention.

FIG. 2 shows an aerial view of two cables 10 according to the present invention towing five streamers 2 each. Each cable 10 is both a lead-in and a manifold cable, providing power to and signal reception from a plurality of seismic streamers 2. That is, the cable 10 leads from the vessel 1 to the first streamer (designated with the reference 2a) and extends beyond the first streamer 2a to provide a connection location for each of the other streamers 2. By contrast, conventional cable configurations use multiple cables to perform the function of a single unitary lead-in and manifold cable 10 of the present invention.

In FIG. 2, each streamer 2 is connected to a cable 10 with a streamer tow terminal 11. It should be noted that the cable 10 is a lead-in and manifold cable. The lead-in, or trunk portion, 60 of the cable 10 comprises the portion of the cable 10 extending from the vessel 1 to the first streamer tow terminal 11 for the first streamer 2a. The manifold portion 50 of the cable 10 comprises the portion of the cable 10 extending beyond the first streamer tow terminal 11 for the first streamer 2a to the paravane 3.

Figure 2A:
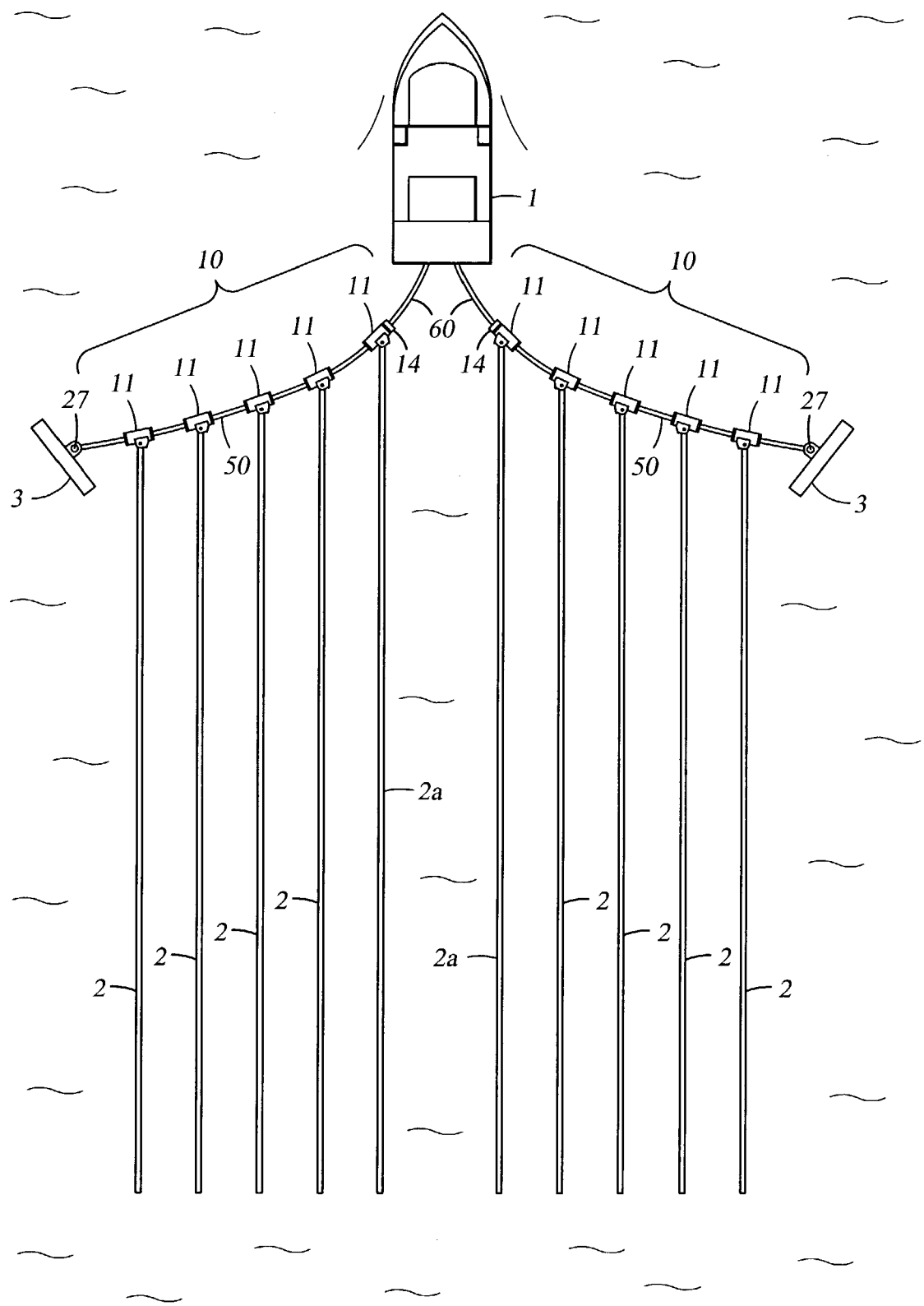
FIG. 2A shows an aerial view of an alternate configuration of two lead-in and manifold cables of the present invention.

In one embodiment, the lead-in and manifold cable 10 runs continuously from vessel to the paravane 3, as illustrated in FIG. 2. In an alternate embodiment, the lead-in section of cable 10 is connected to the manifold section of cable 10 by connector 14, as shown in FIG. 2A, by connection techniques known to those of ordinary skill in the art. In either configuration, the lead-in and manifold cable 10 is spread out using the paravane 3 to draw the lead-in and manifold cable 10 and the streamers 2 out horizontally, giving the desired lateral coverage. Thus, the present lead-in and manifold cable 10 provides a configuration for towing multiple streamers 2 with a tow vessel 1, which requires fewer cable segments and fewer connections between various cable segments, than multiple streamer tow configurations known to the prior art.

Figure 3:
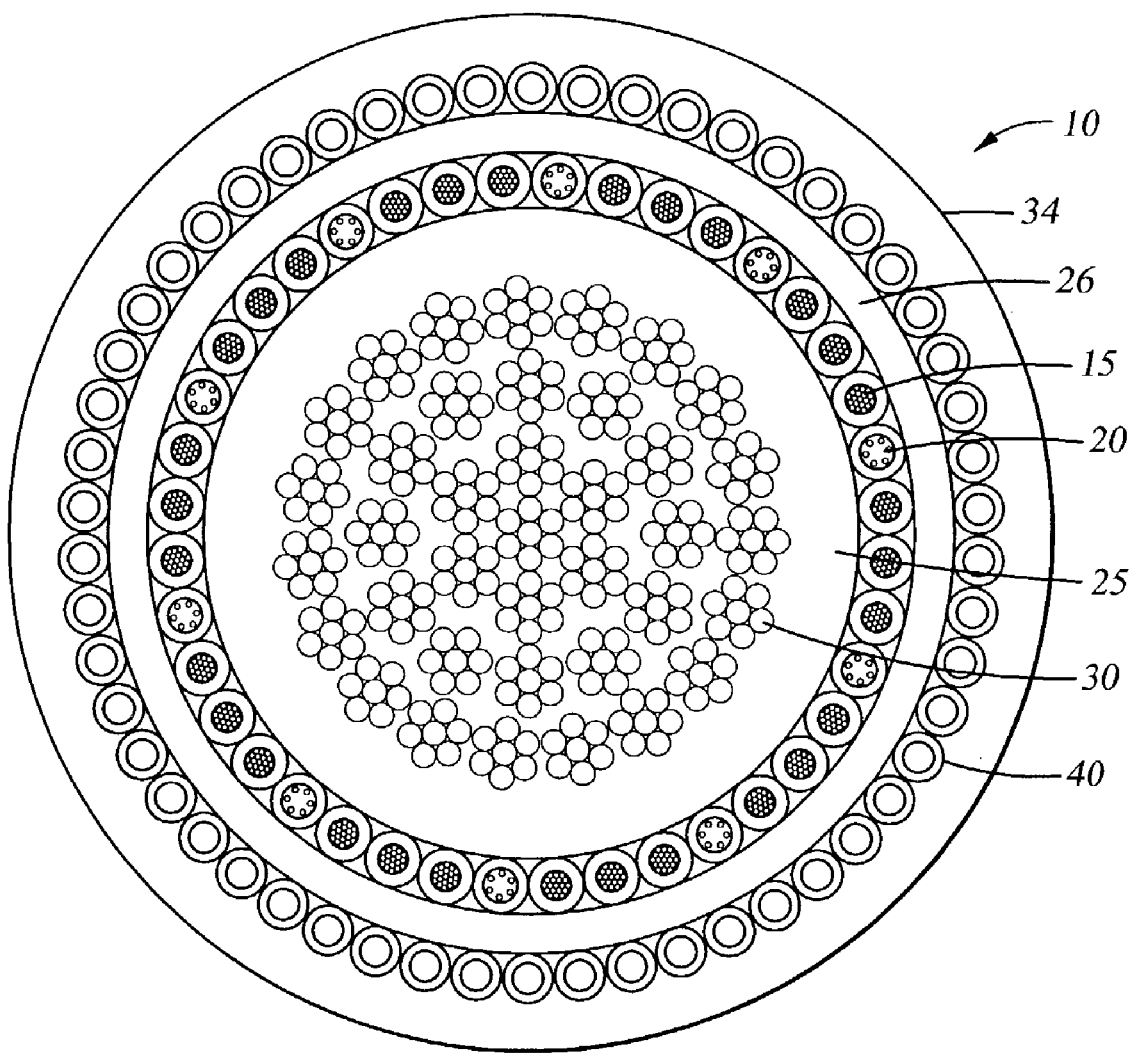
FIG. 3 shows a cross-section of a first embodiment of a lead-in and manifold cable of the present invention.

FIG. 3 shows a cross-section of a first embodiment of the lead-in and manifold cable 10. The lead-in and manifold cable 10 has a center stress core 30, which will serve as a strength member. The center stress core 30 comprises metal wire, a metal rope, an armored rope, Kevlar (Kevlar is a registered trademark of E. I. Du Pont de Nemours and Company), aramid fiber, and/or other material that will occur to those of ordinary skill in the art. Surrounding the center stress core 30 is an inner jacket 25 comprising, for example, plastic, and/or any other suitable material that will occur to those of ordinary skill in the art.

Optical fibers 20 and electrical conductors 15 are wound around the jacket 25 in a helical direction. Optical fibers 20 may be in the form of a stainless steel loose tube, a plastic loose tube, a tight-buffered fiber matrix, or other forms known to those of ordinary skill in the art. By winding the optical fibers 20 and the electrical conductors 15 in a helical direction, the optical fibers 20 and electrical conductors 15 are subjected to less stress when tension is placed on the lead-in and manifold cable 10. Each bundle of optical fibers 20 and each electrical conductor 15 are routed to a specific streamer 2. The optical fibers carry control signals to and data from a specific streamer 2, and the electrical conductors transmit power to a specific streamer 2. For example, if eight streamers 2 are used, optical fibers 20 and electrical conductors 15 for at least eight individual streamers 2 are provided in the cable 10. Typically, at least two electrical conductors 15 and at least four optical fibers 10 (included in one tube) per streamer are provided in the lead-in and manifold cable 10 for each streamer 2. This includes at least two optical fibers for telemetry and at least two optical fibers for multiplexed auxiliary data and at least one electrical conductor 15 for each polarity of the power supply. A typical power supply voltage is, for example, 1,000 V dc.

To protect the optical fibers 20 and the electrical conductors 15, at least one layer of armor 40 surrounds the optical fibers 20 and electrical conductors 15. The armor 40 protects the optical fibers 20 and electrical conductors 15 from damage caused by impact, such as the streamers 2 colliding with one another, damage caused by rolling the streamers 2, or impact from various objects or animals out at sea. However, in this first described embodiment, the armor 40 does not provide substantial tensile strength for the cable 10. The armor 40 comprises Kevlar, aramid fibers, metal, plastic, and/or any other suitable material that will occur to those of ordinary skill in the art. Conductor belt 26, which may be formed from plastic or other suitable material, is positioned between armor 40 and optical fibers 20 and electrical conductors 15 in order to protect the optical fibers 20 and electrical conductors 15 from abrasion by armor 40. The assembly of the cable is completed by the application of the outer jacket 34. Outer jacket 34 may be formed from plastic or other suitable material, and is utilized to retard abrasion of the armor 40.

Figure 4:
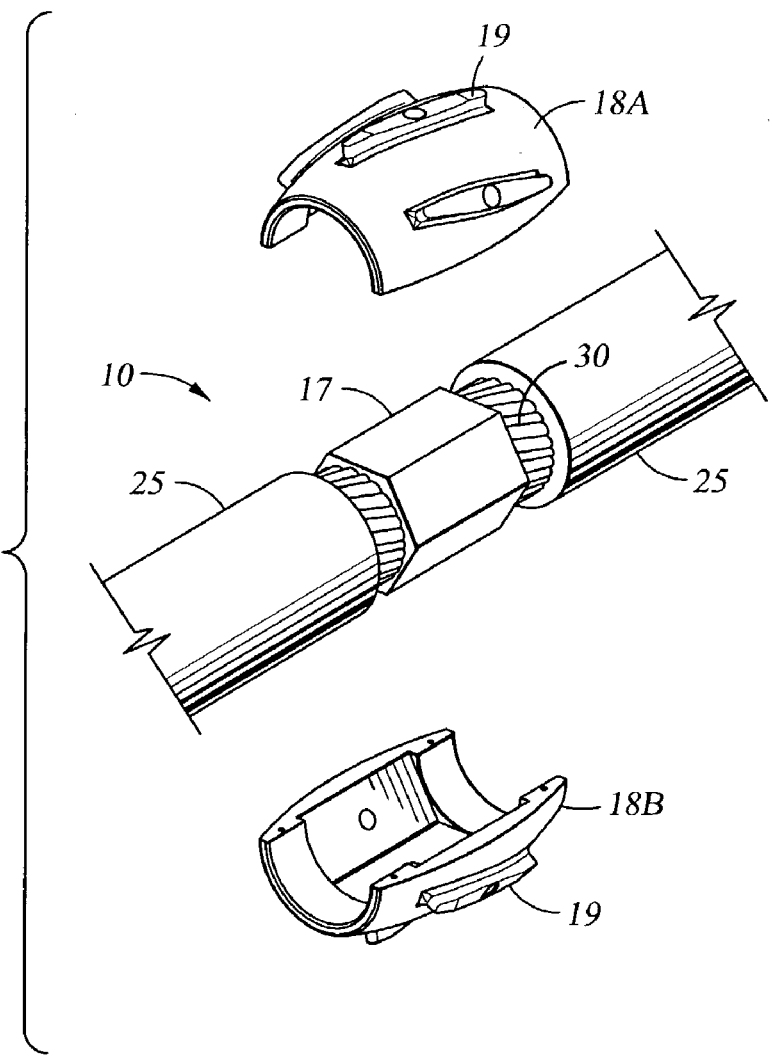
FIGS. 4 and 5 show anchoring elements assembled around a center stress core.
Figure 5:
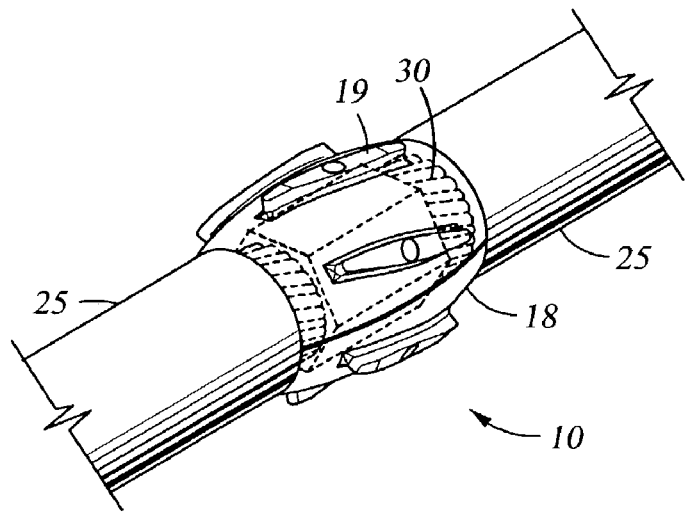
Figure 6:
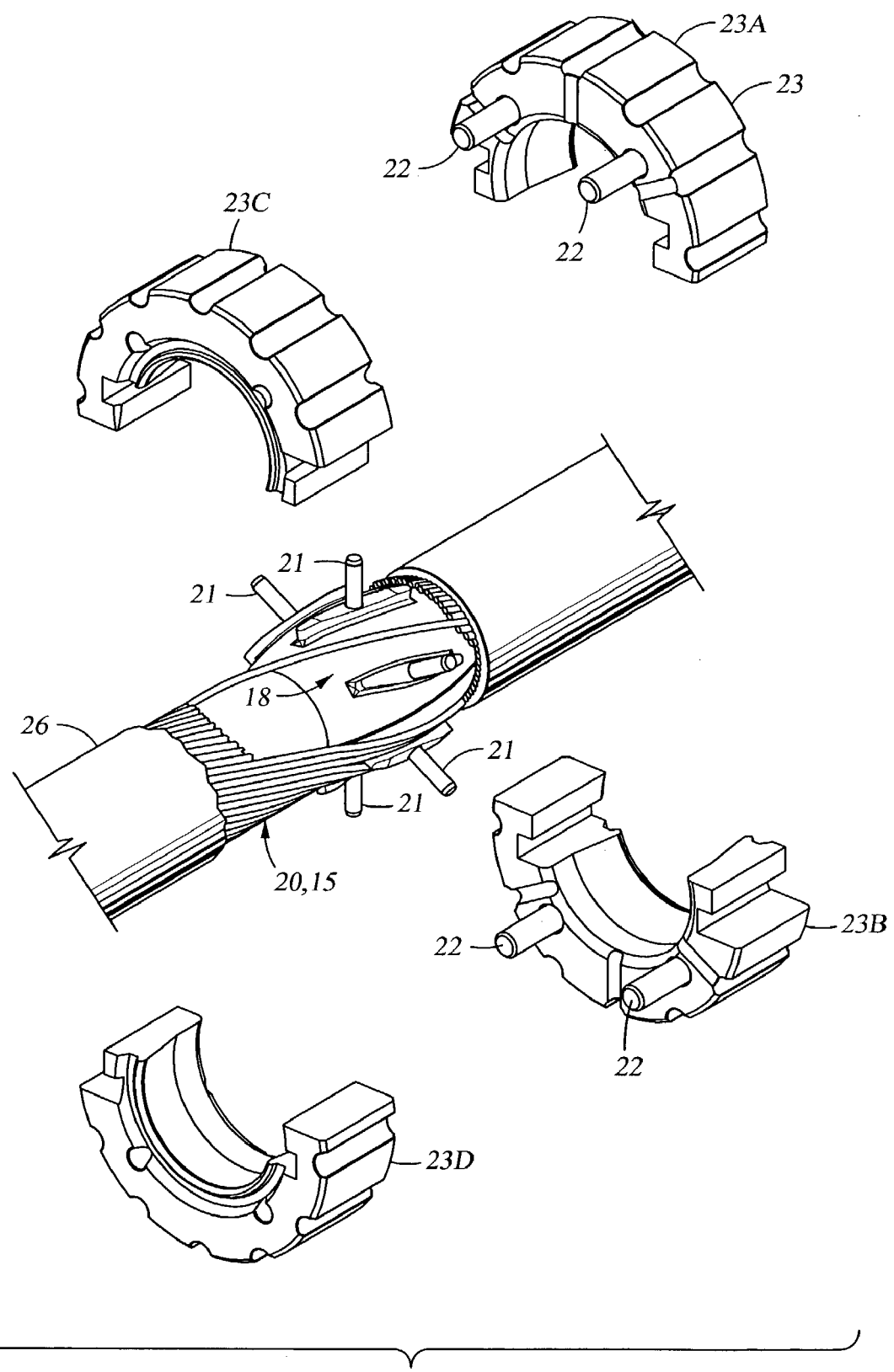
FIG. 6 shows a compression collar as it is assembled around anchoring elements on a center stress core.

Streamers 2 are connected to the lead-in and manifold cable 10 by means of streamer tow terminals 11. FIGS. 4–11 illustrate a particular implementation of the streamer tow terminal 11. The lead-in and manifold cable 10 is continuous (uninterrupted) as it passes each streamer cable tow terminal 11. At each streamer tow terminal 11, only the optical fibers 20 and electrical conductors 15 that are routed to the streamer connected to that particular tow terminal are "broken out". The optical fibers 20 and electrical conductors 15 that are not routed to that specific streamer 2 are continuous, that is, they are not cut and then spliced, but are routed through the terminal, uninterrupted, to the next tow terminal. The center stress core 30 is also continuous, and passes uninterrupted through the tow terminals 11. With reference to FIGS. 4 and 5, in accordance with a first embodiment, a button 17, which may be a substantially cylindrical metallic sleeve is hexagonally swaged onto the center stress core 30 during the assembly process for cable 10 at each connection location from which it is desired to tow a streamer cable. In one implementation of the invention, after a button 17 is swaged onto the center stress core, the button will have a hexagonally shaped exterior. However, button 17 may have a shape other than hexagonal, so long as the button provides an appropriate mounting base for stress anchor 18. As illustrated in FIGS. 4 and 5, stress anchor 18 is then assembled around button 17. Stress anchor 18 is assembled from two mating sections 18A and 18B, as shown in FIG. 4, which may be substantially mirror images of each other. The interior surface of stress anchor 18 is configured to form a mating engagement with the hexagonal exterior surface of button 17, to maintain the rotational position of the anchor with respect to the stress core 30. The elevated ridges (router grooves) 19 on stress anchor 18 provide a mounting support for compression collar 23 (see FIG. 6), thereby creating space between stress anchor 18 and compression collar 23 for routing the optical fibers 20 and electrical conductors 15. The router grooves 19 follow a generally helical pattern that the fiber optic cables 20 and the electrical conductors 15 follow as they are wound around the inner jacket 25 and center stress core 30. Cable 10 is assembled with the optical fibers 20 and the electrical conductors 15 exterior to the stress anchor 18, as shown in FIG. 6. The assembly of the cable is completed by the application of the conductor belt 26, protective armor 40, and outer jacket 34.

As described above, the anchoring elements (button 17 and stress anchor 18) are encased in the cable as the cable is assembled. To secure the tow terminal 11 to the lead-in and manifold cable 10, the encased anchoring elements are exposed. As shown in FIG. 6, the outer jacket 34, armor 40 are removed in the area adjacent the anchoring elements, and a segment of conductor belt 26 is opened to expose the anchoring elements.

Compression collar 23 is then positioned around stress anchor 18. As shown in FIG. 6 compression collar 23 is formed from compression collar elements 23A and 23B, which are interconnected with a tongue and groove mechanism, and compression collar elements 23C and 23D, which are similarly interconnected with a tongue and groove mechanism. Compression collar elements 23A and 23B are then mated with compression collar elements 23C and 23D and secured together with bolts 22, as further illustrated in FIG. 7. Compression collar elements 23A, 23B, 23C and 23D each have curved under surfaces so as to engage the outer surface of stress anchor 18. The shear pins 21, which are inserted into receptacles in elevated ridges 19, extend upwardly from elevated ridges 19 and engage corresponding apertures in the compression collar 23 to maintain the rotational position of the compression collar 23 with respect to cable 10, and to assist in maintaining the axial position of the compression collar 23 with respect to cable 10. Compression collar elements 23A and 23B are secured to compression collar elements 23C and 23D with bolts 22, to maintain compression collar elements 23A and 23B in compressive engagement with stress anchor 18. Button 17, stress anchor 18 and compression collar 23 form a mounting assembly for tow terminal 11.

Figure 7:
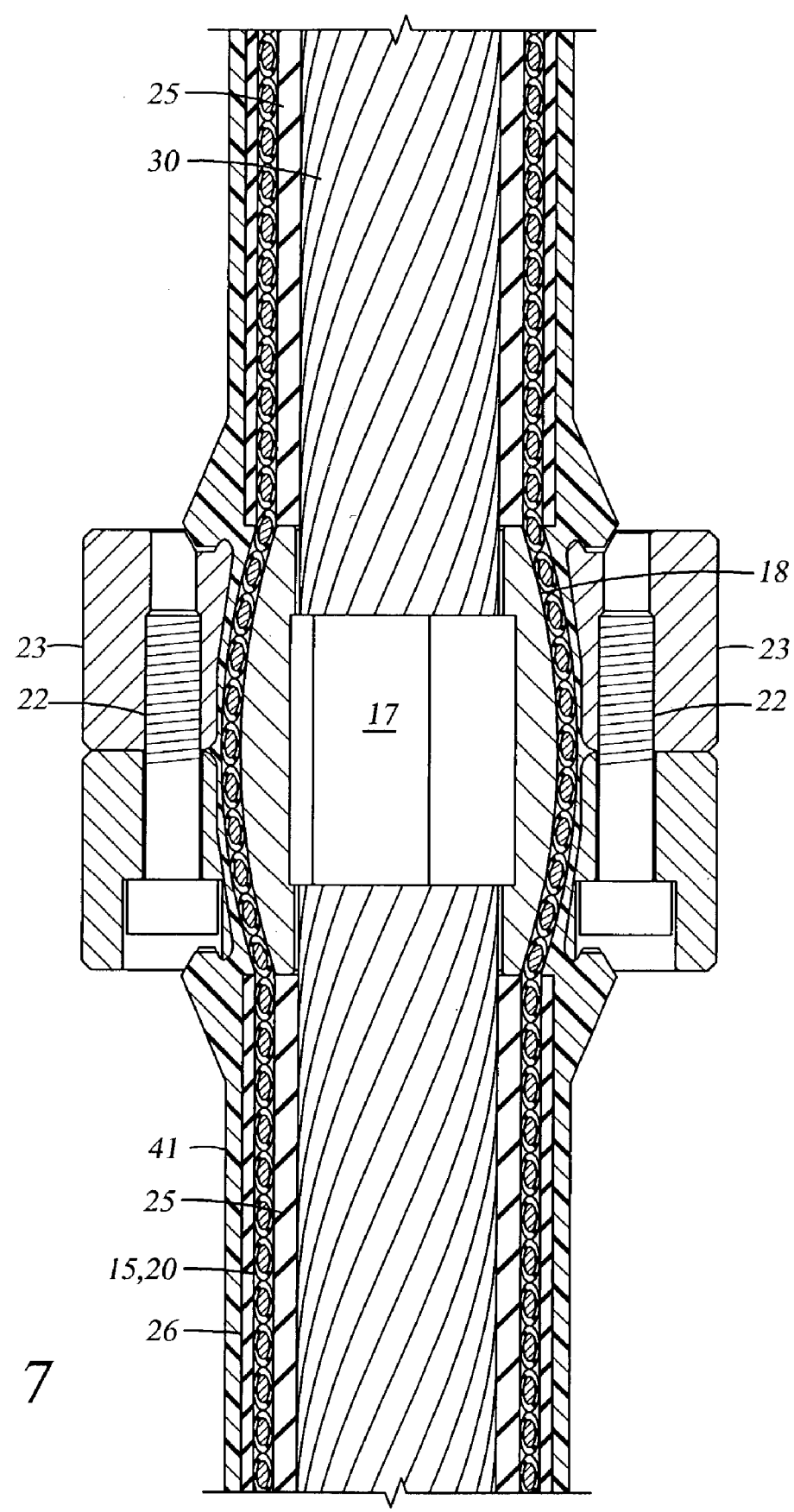
FIG. 7 shows a side view cross-section of an implementation of the present invention.

FIG. 7 shows a cross-section of the button 17, stress anchor 18, and compression collar 23 assembled onto the stress core 30 of lead-in and manifold cable 10.

Figure 8:
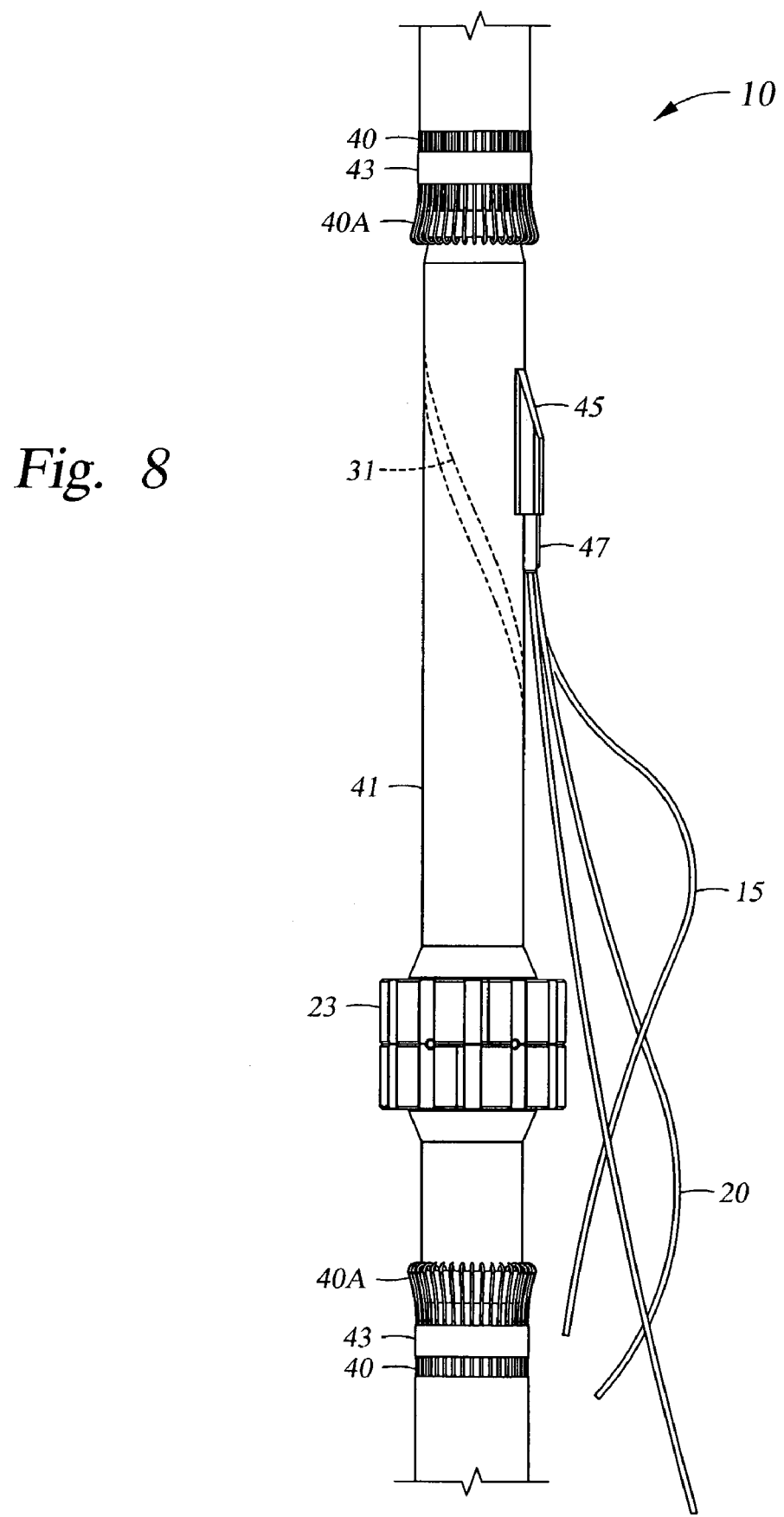
FIG. 8 shows the "break-out" of optical fibers and electrical conductors from a manifold and lead in cable for assembly of a streamer tow terminal.

As illustrated in FIG. 8, dedicated ones of the optical fibers 20 and electrical conductors 15 are "broken out" at each streamer tow terminal 11. Typically, at least two electrical conductors 15 and at least four optical fibers 20 (typically included in one loose tube) are broken out for connection into each steamer cable 2. As shown in FIG. 8, the exterior armor 40 is severed and terminated on either side of the connection location for assembling streamer tow terminal 11 onto the cable 10. As indicated by the dotted lines in FIG. 8, a helical strip 31 of the conductor belt 26, following the path of the optical fibers 20 and electrical conductors 15 to be "broken then out" is removed in order to permit a length of the electrical conductors 15 and the optical fibers 20 to be broken out as shown in FIG. 8. An overmold 41 is then formed around conductor belt 26 which will cover and seal the area where the helical strip was removed. As shown more clearly in FIG. 7, the overmold 41 material also fills the void spaces in the region where button 17, stress anchor 18 and compression collar 23 are assembled around the inner stress core 30 in order to provide a water proof seal for the interior of cable 10 at the location of the streamer tow terminal 11. The overmold 41 is typically formed from the same material as the conductor belt 26. With reference to FIG. 8, the electrical conductors and optical fibers are broken out through periscope 45, which is formed into the overmold. Sealing boot 47, which may be formed from the same material as conductor belt 26, is applied over the electrical conductors 15 and optical fibers 20 at the point where they exit the periscope 45 for sealing purposes in order to prevent water from getting into the core of the cable.

The armor 40 is then secured around overmold 41 on each side of the streamer tow terminal location with bands 43, which may be stainless steel or other corrosion resistant metal. Potting cups (not shown) are installed over the armor terminations of each side of the tow terminal, and a wire lock is applied to the ends of the armor, which may be an epoxy resin and diatomaceous earth material, or other similar material to form armor terminations 40A.

Figure 9:
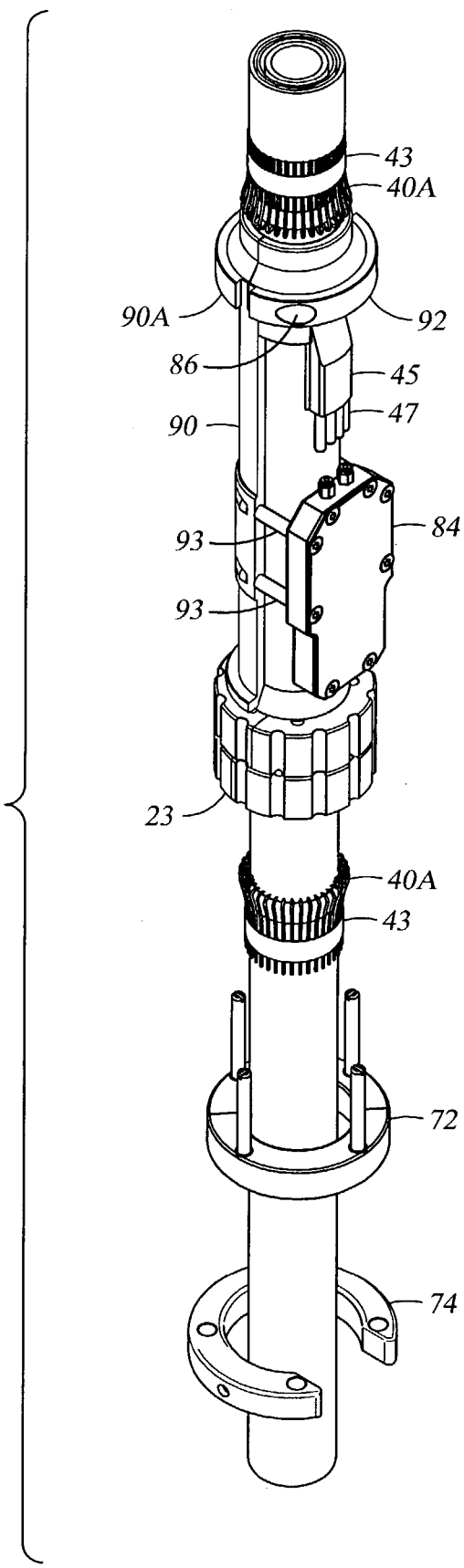
FIG. 9 is a further illustration of the assembly of a streamer tow terminal.

FIG. 9 shows a portion of the streamer tow terminal 11, including torsion bar 90. A first end of torsion bar 90 is mated, typically with bolts or screws (not shown), with torsion bar clamp 92 in compressional engagement with armor termination 40A. The other end of torsion bar 90 is bolted or otherwise affixed to compression collar 23. Torsion bar 90 provides structural stability to prevent the two portions of split outer housing 80 (see FIG. 10) from rotating with respect to each other Splice tray 84 is secured to torsion bar 90 by means of screws 93. The optical and electrical conductors are omitted from FIG. 9 for clarity. However, with reference to FIGS. 9 and 10, the optical fibers and electrical conductors that are broken out are extracted through sealing boot 47 and are connected to corresponding optical fibers and electrical conductors in the swivel connector 98 by which a streamer cable 2 is connected to a tow terminal 11. The optical fibers that are broken out extend from sealing boot 47 to splice tray 84, which is utilized for splicing together, by standard means known to those of ordinary skill in the art, the optical fibers broken out from the lead-in and manifold cable 10 with corresponding optical fibers extending to swivel connector 98.

Figure 10:
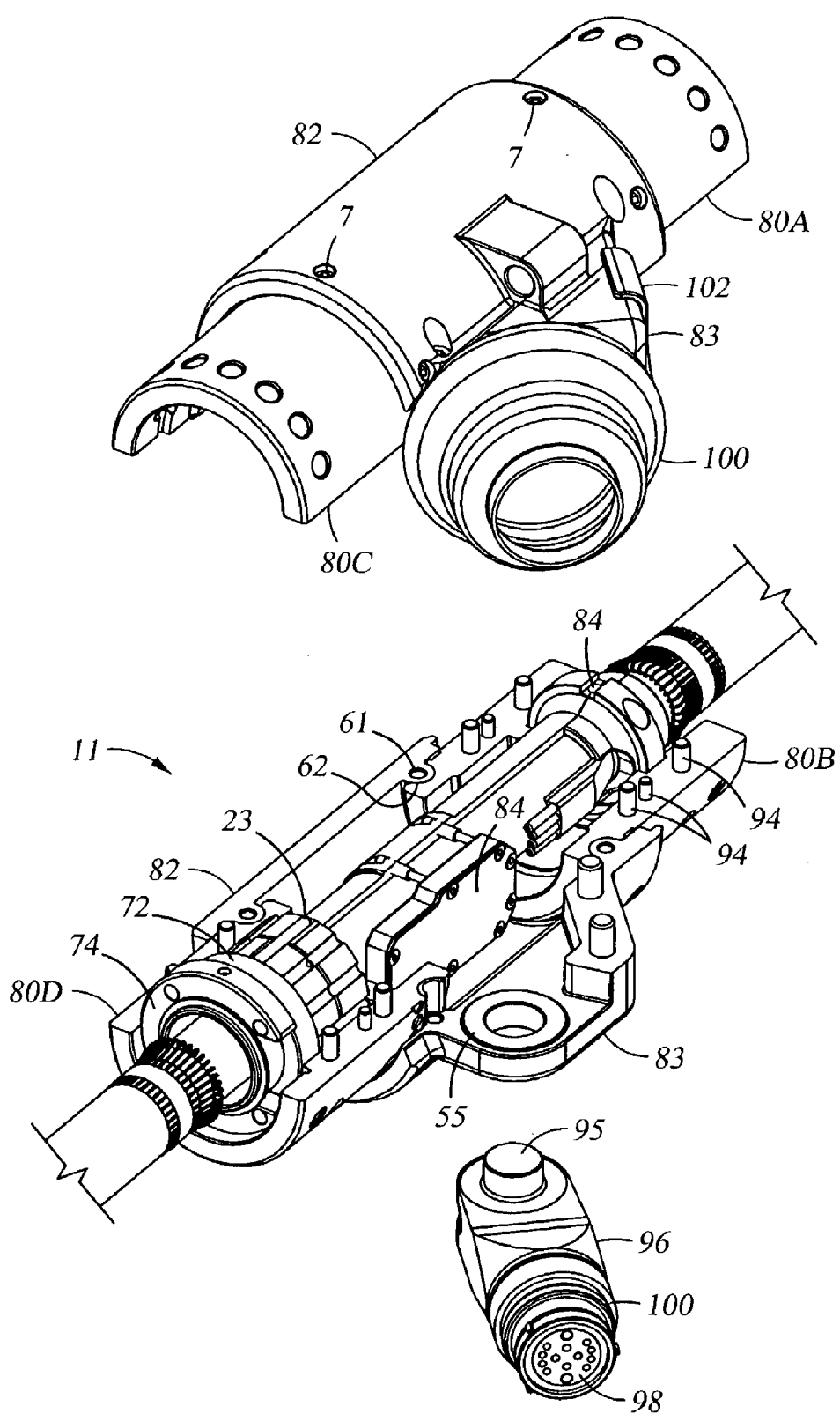
FIG. 10 shows still a further assembly of a streamer tow terminal.

FIG. 10 shows in cross-section the split outer housing 80 assembled at each end of the streamer tow terminal 11, with the connector collar 82 extending between the two sections of the split outer housing. Split outer housing 80 is assembled from four components, 80A, 80B, 80C and 80D. Mating housing components 80A and 80B are affixed by way of keying pins (not shown) to the keyways 86 in the elevated ring of torsion bar 90 (and torsion bar clamp 92) to form one end of split outer housing 80, and mating components 80C and 80D are mounted onto compression collar 23 to form the other end of split outer housing housing 80. The interior surfaces of split outer housing elements 80C and 80D have a pattern of grooves and ridges that mate with the corresponding pattern of the compression collar 23. Split outer housing elements 80A and 80B, and split outer housing elements 80C and 80D are assembled together by means of bolts and guide pins such as those identified by numeral 94 in FIG. 10. The projecting pins in split locking ring 72 are installed into the pattern of grooves and ridges in housings 80C and 80D and compression collar 23, maintaining rotational position of housings 80C and 80D with respect to cable 10. Locking stud 74 is then installed to maintain axial position of housing elements 80C and 80D with respect to cable 10. A connector collar 82 is then assembled around the two sections of split outer housing by means of a tongue and groove connection, to enable rotational movement of the connector collar with respect to the split outer housing 80. Such rotational movement is desirable because it permits proper rotational orientation of the streamer cable with respect to lead-in and manifold cable 10 to be established prior to beginning towing operation. After the desired orientation is established, set screws 88 are utilized to fix the rotational orientation of the attached streamer cable 2 to the lead-in and manifold cable 10. With reference to FIG. 10 the tongue portion 61 extends from connector collar 82 into groove portion 62 of split outer housings 80. Connector collar 82 includes a swivel connection, described further below, by which a streamer cable 2 is mechanically connected to tow terminal 11 and cable 10.

With reference to FIG. 10, each half of connector collar 82 includes an extension 83, which includes an aperture 55 for providing a swivel connection between the tow terminal 11 and streamer 2. As shown in FIG. 10, pivot arm 96 includes pivot studs 95 (only one of which is visible in FIG. 10) which are inserted into bushings (not specifically shown) in apertures 55. Electrical conductors are routed from the periscope 45 through pivot arm 96 to swivel connector 98, and optical fibers are also routed from the periscope, via the splice tray 84, to swivel connector 98, by standard techniques known to those of ordinary skill in the art. A mating connector (not shown) connects corresponding optical fibers and electrical conductors extending within streamer 2 to the optical fiber and electrical conductor terminations in swivel connector 98, as the streamer 2 is attached to terminal 11 by threaded engagement with threaded connection 97.

Figure 11:
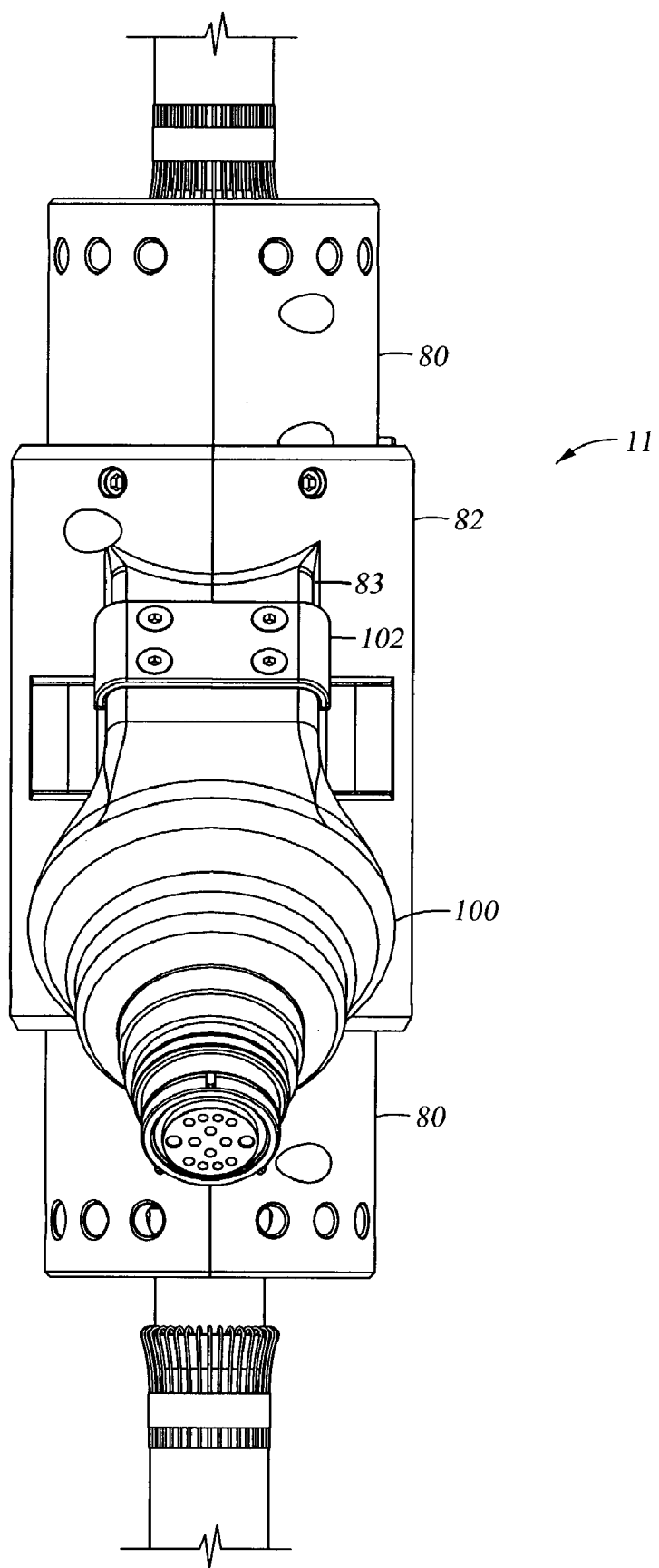
FIG. 11 shows still another view of a streamer tow terminal.

FIG. 11 shows assembled streamer tow terminal 11, which further includes a protective bellows 100. Bellows 100 is affixed for the purpose of deflecting debris. Bellows 100 is attached to connector collar extension 83 by means of bellows clamp 102, and a bolt (not visible in FIG. 11) which attaches the bellows to extension 83 on the underside of bellows 100.

In the embodiment described with reference to FIGS. 4–11, the streamer tow terminal 11 allows the center stress core 30, and all of the uninterrupted fiber optic cables 20 and electrical conductors 15 to pass through—uncut and unspliced—to their assigned streamer cable. Only the individual fiber optic cables 20 and electrical conductors 15 that are connected into the streamer attached to a tow terminal 11 are cut and then spliced into the streamer 2. That is, only the optical fibers 20 or electrical conductors 15 assigned to the specific streamer 2 are "broken out." The remainder of the optical fibers 20 and conductors 15 are uninterrupted and will continue to the next streamer tow terminal 11 at the next streamer 2, where again, only the specific optical fibers 20 and electrical conductors 15 assigned to that specific streamer 2 are "broken out."

Returning to FIG. 2, at the end of the lead-in and manifold cable 10, a simple mechanical termination 27 is installed to connect the lead-in and manifold cable 10 directly to the paravane 3. Typical mechanical terminations comprise a bolt, a preformed termination, and/or any other termination that will occur to those of ordinary skill in the art. Such terminations 27 are widely known to those of ordinary skill without further explanation.

Figure 12:
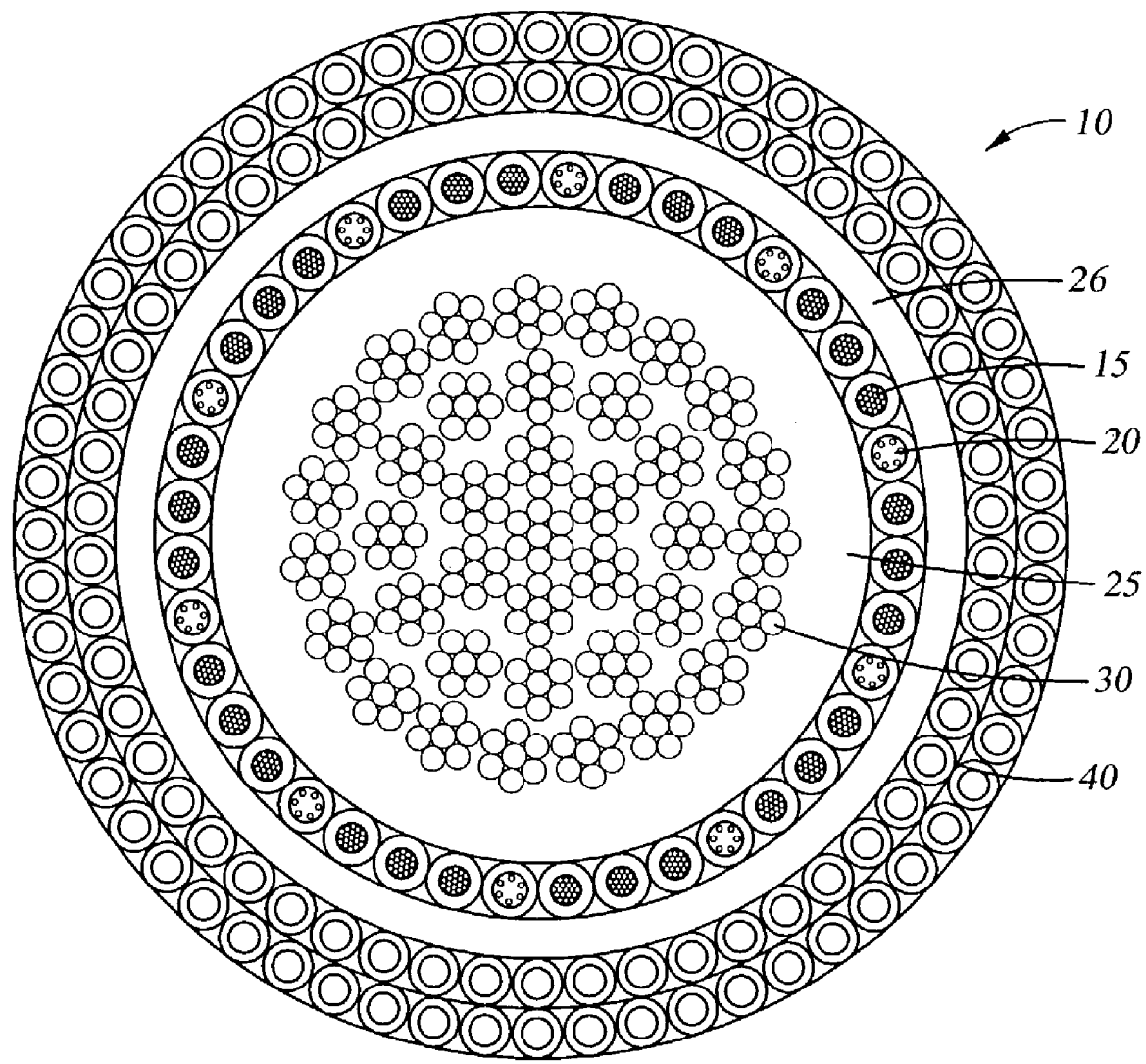
FIG. 12 shows a cross-sectional view of an alternate embodiment of a lead-in and manifold cable.

In another embodiment of the invention, the external armor also functions as a strength bearing element. A cross-section of this embodiment of the invention is shown in FIG. 12, in which cable 10 includes a center stress core 30 comprising Kevlar, aramid fibers, metal, alloy, armor, and/or any other suitable material. A jacket 25 comprising plastic and/or any other suitable material surrounds the center stress core 30. Wrapped around the jacket 25 are fiber optic cables 20 and electrical conductors 15. Conductor belt 26 surrounds the optical cables and electrical conductors. The external armor 40 is shown as comprising two layers to indicate its greater strength bearing capacity. Typically, no outer jacket will be utilized because of the additional cable diameter resulting from utilizing a strength member as the external armor 40.

Figure 13:
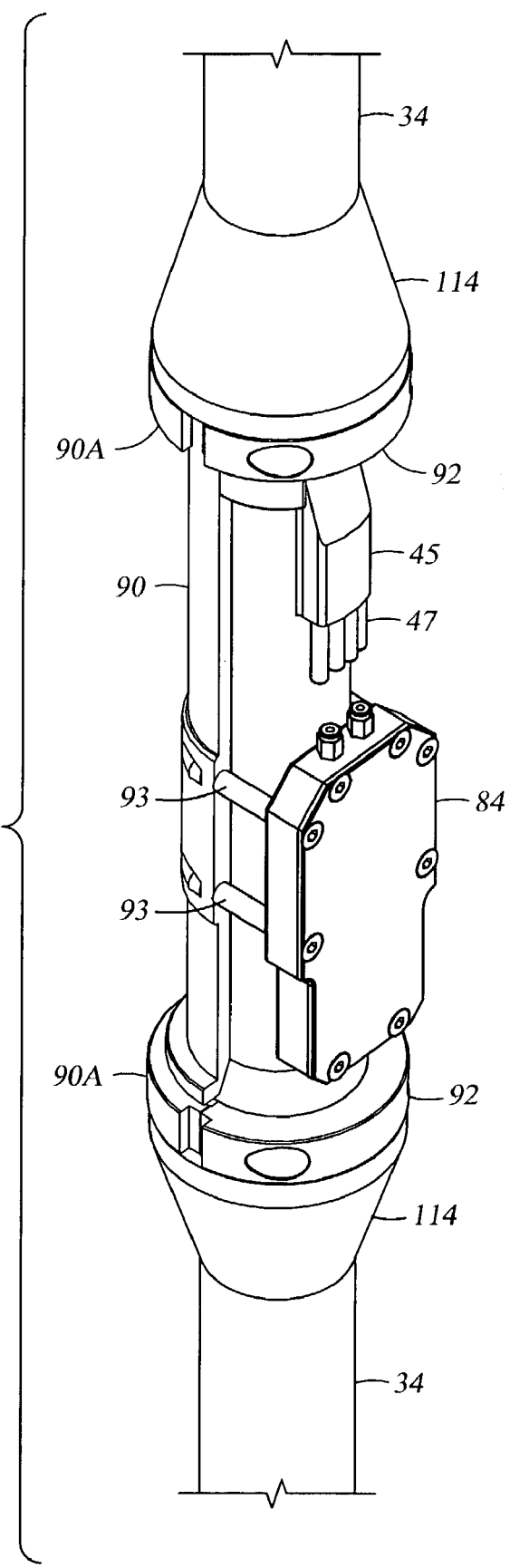
FIG. 13 is an illustration of the assembly of a streamer tow terminal for the lead-in and manifold cable of FIG. 12.
Figure 13A:
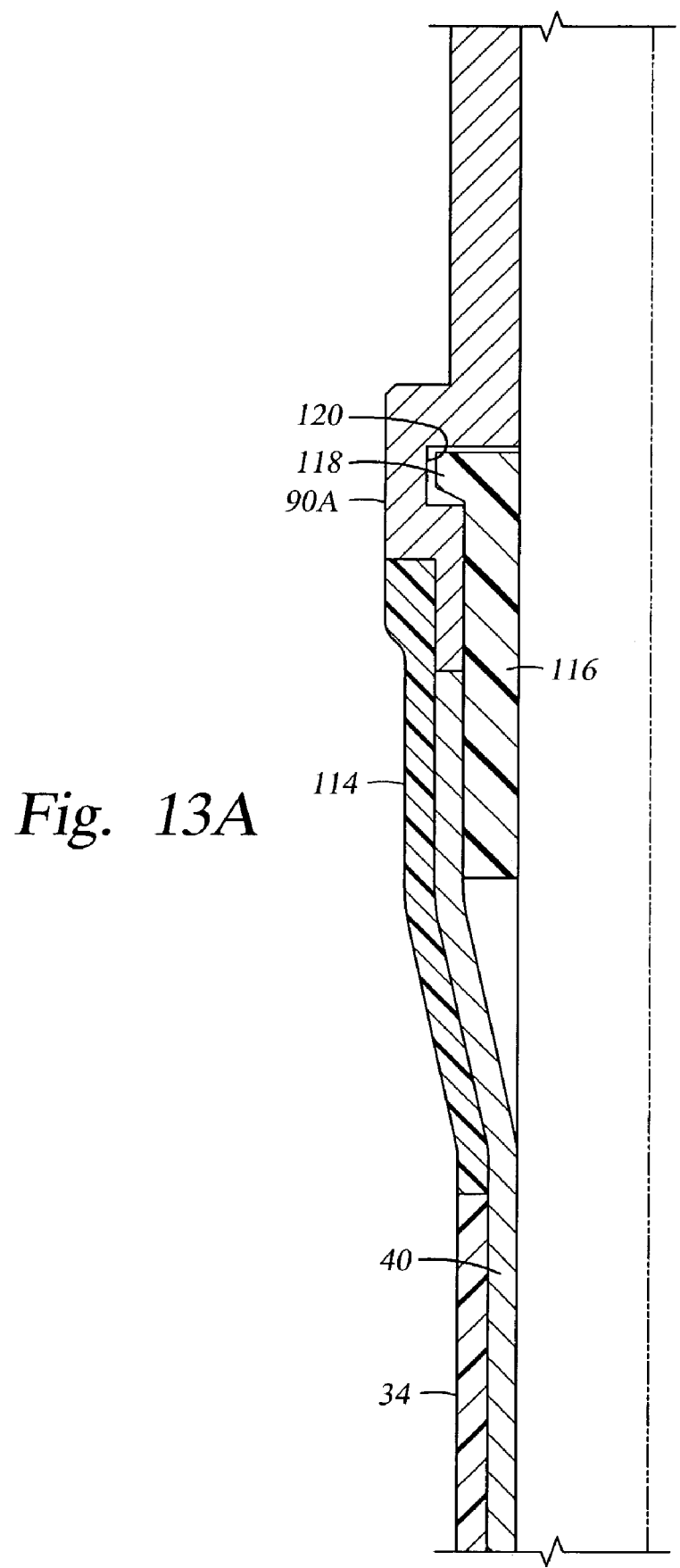
FIG. 13A shows a detail of the assembly of the embodiment shown in FIG. 13.
Figure 14:
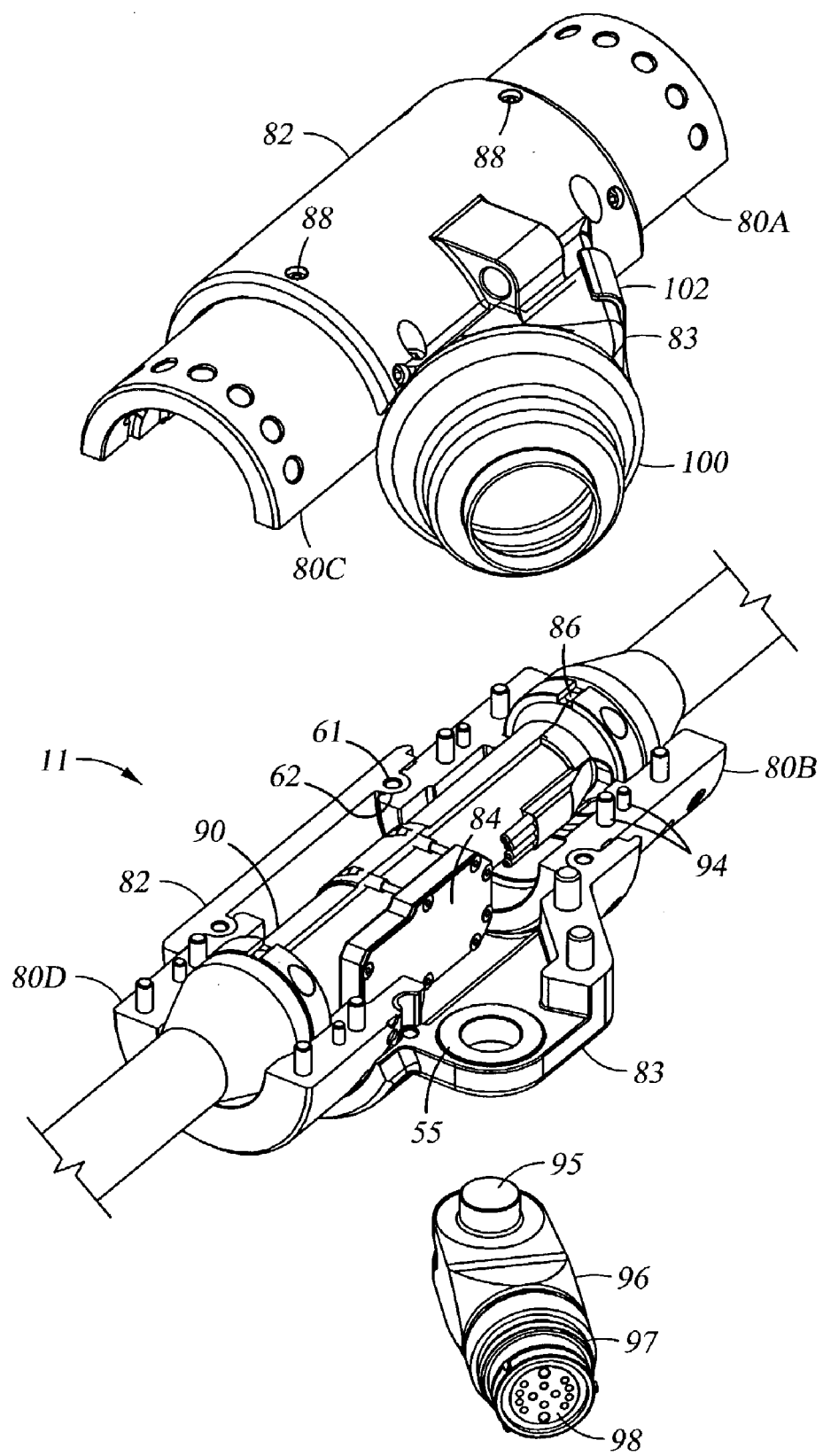
FIG. 14 is a further illustration of the assembly of a streamer tow terminal for the lead-in and manifold cable of FIG. 12.

The connection mechanism for attachment of cable 10 according to this second embodiment of the invention is similar to the tow connector described with respect to FIGS. 4–11, except that the mounting assembly elements (button 17, stress anchor 18 and compression collar 23) are not utilized. Instead, as shown in FIG. 13, torsion bar 90 extends for substantially the length of the tow terminal 11, and elevated ring 90A of torsion bar 90 and torsion bar clamp 92 are interconnected with armor 40 as more clearly described with reference to FIG. 13A. FIG. 13A shows a detail of the assembly of the embodiment shown in FIG. 13. A potting cup, including an inner portion 116 and an outer portion 114 is positioned around the severed ends of armor 40. The potting cup; is then interconnected with elevated ring 90A of torsion bar 90 and torsion bar clamp 92 (not shown in FIG. 13A) by a tongue 120 and groove 118 configuration. Potting cup 116, 114 may be formed from an epoxy resin and diatomaceous earth material. Similarly, as shown in FIG. 14, split outer housing elements 80C and 80D are mounted onto the lower end of the torsion bar 90 and split outer housing elements 80A and 80B are mounted onto the upper end of the torsion bar 90 in substantially the same manner as split outer housing elements 80A and 80B are mounted onto the upper end of the torsion bar 90 in FIG. 10.

Designated optical fibers and electrical conductors are extracted from the cable 10 and connected to the streamer cable 2 in the same manner as for the previously described embodiment. As in the previously described embodiment, only the optical fibers and electrical conductors designated for connection to the specific streamer are "broken out". The center stress core 30 passes uninterrupted through each connection location for each streamer cable 2 from the vessel 1 to the paravane 3. The rest of the fiber optic cables 20 and electrical conductors 15, and the center stress core 30, pass uninterrupted past the location of the streamer tow terminal 11. As with the previously described embodiment and illustrated in FIG. 2, at the end of the manifold section 50 of the cable 10, the center stress core 30 is fitted with a typical mechanical termination 27 and connected to the paravane 3. Mechanically, in this second embodiment, the external armor 40 supports the load put on the cable 10 by the streamer 2, and the center stress core 30 supports the load put on the cable 10 by the paravane 3.

A benefit to this embodiment is that the center stress core 30 carries the load put on the cable 10 by the paravane 3, and the load put on the cable 10 by the streamers 2 is carried mostly by the external armor 40. Thus, the load carrying elements (armor 40 and center stress core 30) of the cable 10 are substantially separate. Where the streamer loads are expected to be comparatively low (e.g., 6 tonnes) the armor 40 material comprises, for example, standard plow steel, Kevlar, or other load-bearing material, which may have a more limited towing capacity than is required from the stress core, which carries the load of the paravane.

Figure 15:
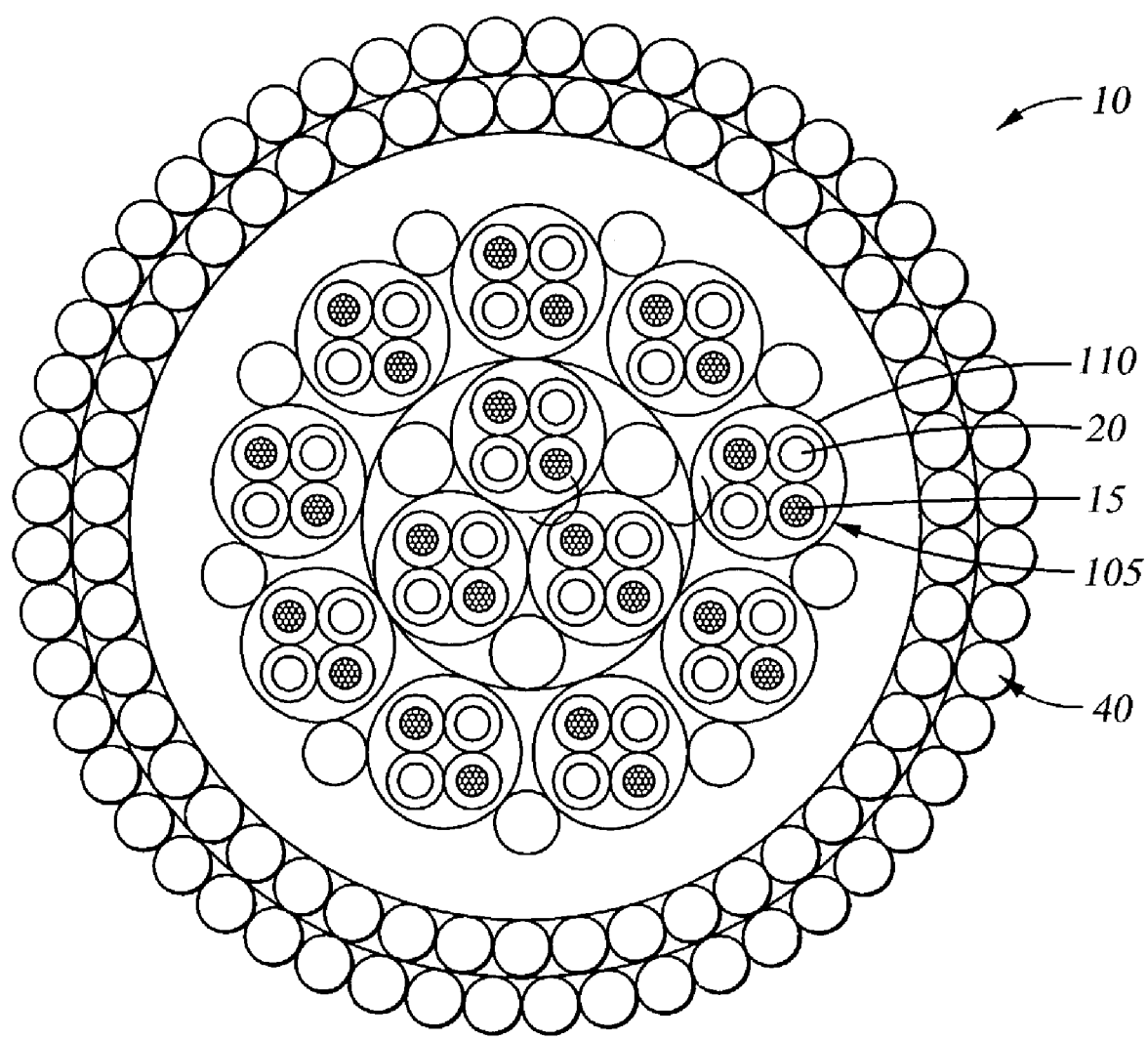
FIG. 15 is a cross-sectional view of yet another embodiment of a lead-in and manifold cable.

The use of both the center stress core 30 and the armor 40 as a strength member causes an increase in the diameter of cable 10. Therefore, according to still a further embodiment of the invention, the lead-in and manifold cable 10 has yet another design. In this embodiment the center stress core is not utilized and the external armor/strength member carries all the lift of the paravane and the weight and drag of the streamer cables. FIG. 15 shows a cross-sectional view of this embodiment. Looking at the cable 10 from the outside in, the cable 10 comprises a double layer of external armor 40 comprising Kevlar, aramid fibers, metal and/or any other suitable material that will occur to those of ordinary skill in the art. Beneath the external armor 40 are fiber optic cables 20 and the electrical conductors 15, which are grouped into individual bundles 105. An independent sheath 110 covers the fiber optic cable 20 and electrical conductors 15 of each bundle 105 to facilitate easy identification of which fiber optic cables 20 and electrical conductors 15 are to be broken out at each streamer 2.

In this third embodiment, the streamer connection terminal 11 is the same as described for the second embodiment with reference to FIGS. 13 and 14, except the diameter of the lead-in and manifold cable 10 will be smaller because there is no center stress member, and the elements of the streamer tow terminal 11 can be smaller in scale.

Figure 16:
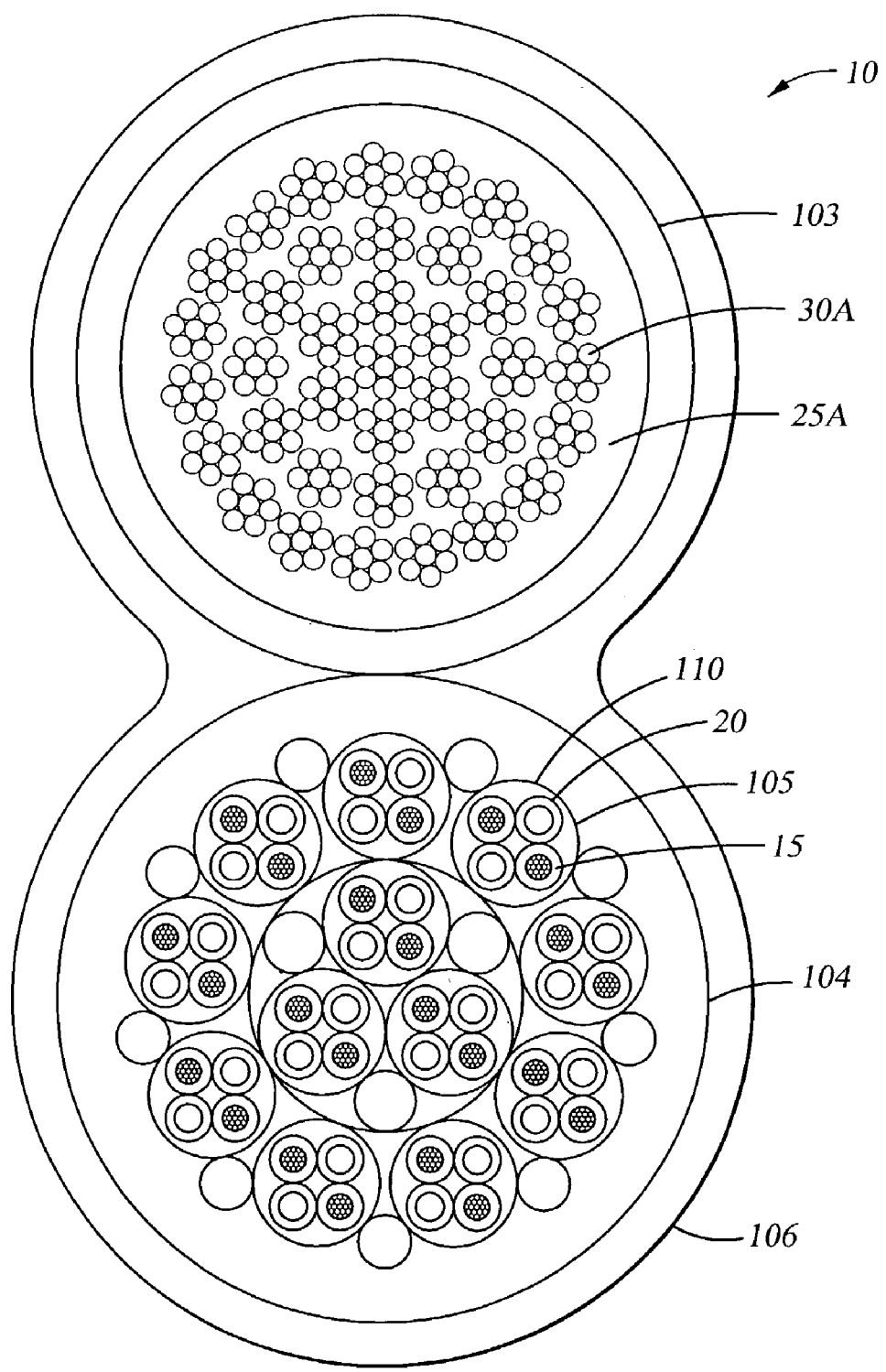
FIG. 16 is a cross-sectional view of still another embodiment of a lead-in and manifold cable.
Figure 17:
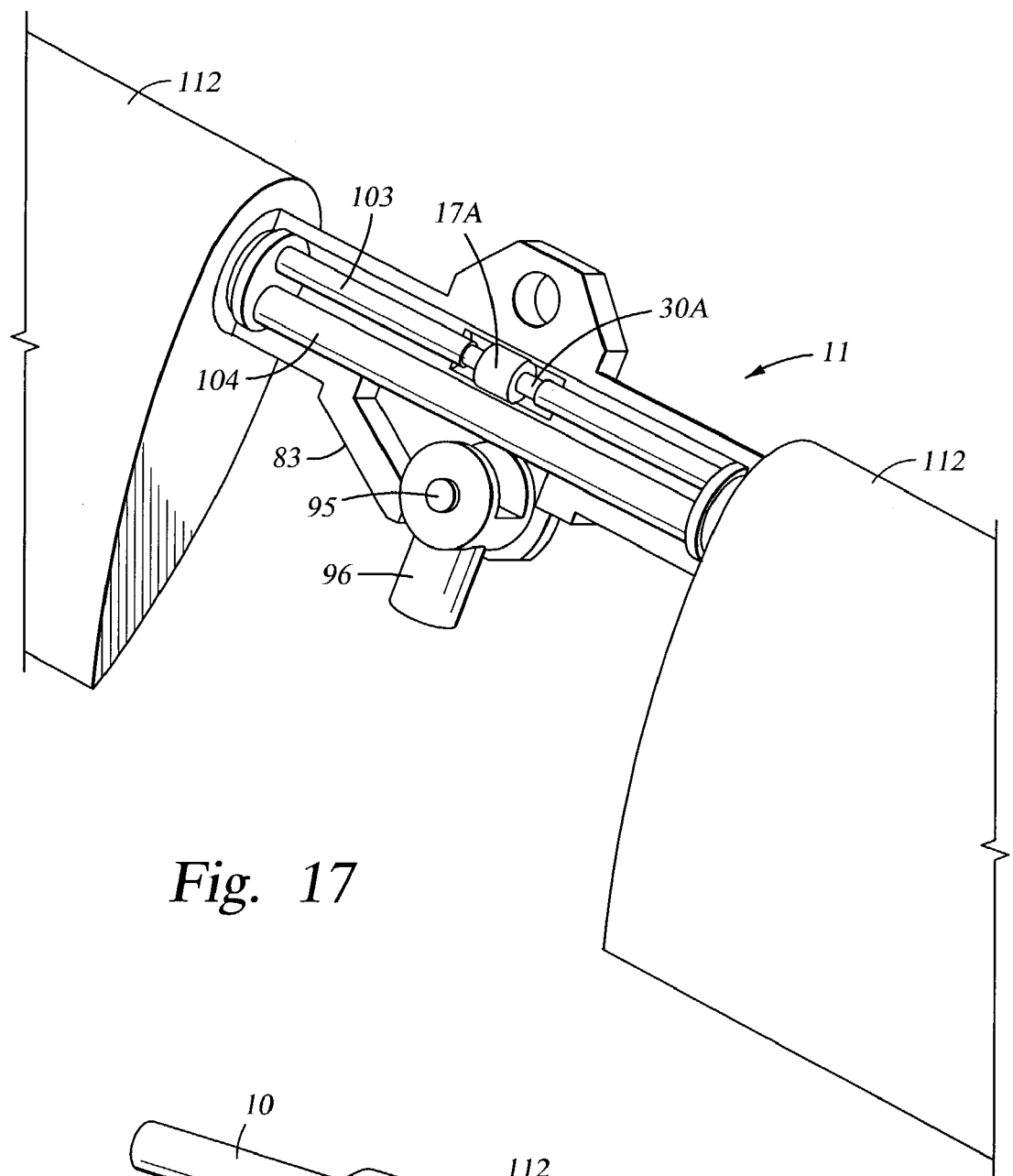
FIG. 17 is a schematic view of a streamer tow for the embodiment of the invention shown in FIG. 16.
Figure 18:
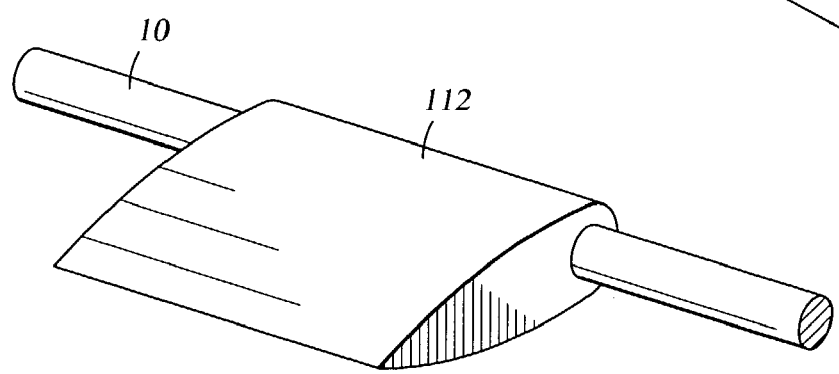
FIG. 18 illustrates a fairing as used with the present invention.

In yet another embodiment, as shown in cross-section in FIG. 16, the strength bearing member 30A and the optical fibers 20 and electrical conductors 15, of lead-in and manifold cable 10, are not in a concentric configuration with respect to each other. Instead, the optical fibers 20 and electrical conductors 15 are encapsulated in a rubber sleeve 104, that extends along, but is external to, the strength bearing member 30A, which is surrounded by a rubber sleeve 103. An abrasion-resistant molding 106 extends around both the strength bearing member 30A and the optical fibers 20 and electrical conductors 15. With reference to FIG. 17, normally, fairings 112 are positioned along the molding 106. The fairings 112 are adapted to limit bending of the strength member 30A and optical fibers 20 and electrical conductors 15, as well as to streamline the flow of the cable 10 through the water. FIG. 18 illustrates a fairing 112 that may be located along the cable 10 between the streamer tow terminals 11 to reduce the drag on the cable 10. In some examples, the fairing 112 comprises a simple canvas fairing or a semi-rigid fairing. In other examples, the armor itself is shaped as a fairing. Other fairings will occur to those of ordinary skill without departing from the invention In order to attach tow connector 11 to this embodiment of the lead-in and manifold cable 10, a button 17A is swaged or otherwise affixed onto the strength member 30A as shown in FIG. 17. Although not shown in detail in FIG. 17, the tow connector 11 may be configured substantially as described for the embodiment of the invention described with reference to FIGS. 4–11, except that the configuration of the various elements of tow connector 11 will need to be adapted to fit the cross-section of lead-in and manifold cable 10, as shown in FIG. 16.

The various examples of the invention are not limited to use in steamer operations. Alternate embodiments are used anywhere a number of sensors or sensor modules are used, or where it is an advantage to reduce the number of cables or cable splices (for example, ocean bottom cable systems, dragged array systems, vertical array systems, or any other system that will occur to those ordinary skill in the art).

Although described here as fiber optic cables 20, in alternate embodiments, the seismic data conductors for transmitting signals from the receivers to the vessel comprise steel wires, copper wires, alloy wires, cables, and/or any other seismic data conductor that will occur to those of ordinary skill in the art.

The invention has been described with a certain degree of particularity, however, many changes may be made in the details without departing from the scope of the invention. It is understood that the invention is not limited to the embodiments set forth herein, but is to be limited only to the scope of the attached claims, including the full range of equivalency to which each element thereof is entitled.

What is claimed is:

1. A method for marine geophysical exploration, comprising:

towing a first cable with a vessel, said first cable having a plurality of streamer cables connected thereto, each said streamer cable being affixed to said first cable at a connection location by means of a connector assembly and wherein electrical power and data transmission conductors for said connected streamer cables are routed through said connector assemblies;

providing all towing strength members and all electrical power and data transmission conductors for said connected streamer cables through said first cable;

extending at least one strength member continuously past a first connector assembly by which a streamer cable is affixed to said first cable to at least a second connector assembly by which a second streamer cable is affixed to said first cable;

wherein said first connector assembly comprises a mounting assembly affixed to at least one strength member, a connector housing affixed to said mounting assembly, and a swivel connector in pivotal engagement with said connector housing; and wherein said mounting assembly comprises a button affixed to said at least one strength member, a stress anchor assembled around said button, and a compression collar positioned in compressive engagement around said stress anchor.

2. A system for marine geophysical exploration, comprising:

a first cable connected to a vessel, a plurality of streamer cables connected to said first cable, each of said plurality of streamer cables being affixed to said first cable at a connection location by means of a connector assembly and wherein electrical power and data transmission conductors for said connected streamer cable are routed through said connector assemblies;

said first cable including all towing strength members and all electrical power and data transmission conductors for said connected streamer cables;

wherein at least one strength member extends continuously past a first connector assembly by which a streamer cable is affixed to said first cable to at least a second connector assembly by which a second streamer cable is affixed to said first cable;

wherein said first conductor assembly comprises a mounting assembly affixed to at least one strength member, a connector housing affixed to said mounting assembly, and a swivel connector in pivotal engagement with said housing; and wherein said mounting assembly comprises a button affixed to said at least one strength member, a stress anchor assembled around said button, and a compression collar positioned in compressive engagement around said stress anchor.

3. A system for towing a plurality of streamer cables with a vessel, comprising:

a first cable extending from a towing vessel, said first cable including at least one strength member, a plurality of electrical power conductors and a plurality of data conductors therein;

a plurality of streamer cable connection locations on said first cable;

a first connector assembly affixed to said first cable at a first streamer cable connection location, said first connector assembly connecting at least one electrical power conductor and at least one data conductor included in said first cable to a connector for attachment to a first streamer cable;

a second connector assembly affixed to said first cable at a second streamer cable connection location, said second connector assembly connecting at least one electrical power conductor and at least one data conductor included in said first cable to a connector for attachment to a second streamer cable, wherein at least one strength member, at least one electrical power conductor and at least one data conductor extend continuously past said first connector assembly to at least said second connector assembly;

wherein said first connector assembly comprises a mounting assembly affixed to said at least one strength member, a connector housing affixed to said mounting assembly, and a swivel connector in pivotal engagement with said housing; and wherein said mounting assembly comprises a button affixed to said at least one strength member, a stress anchor assembled around said button, and a compression collar positioned in compressive engagement around said stress anchor.

4. A method for marine geophysical exploration, comprising:

towing a first cable with a vessel, said first cable including at least one strength member, a plurality of electrical power conductors and a plurality of data conductors therein;

providing a plurality of streamer cable connection locations on said first cable;

affixing a first connector assembly to said first cable at a first streamer cable connection location, and connecting by means of said first connector assembly at least one electrical power conductor and at least one data conductor included in said first cable to a connector for attachment to a first streamer cable;

affixing a second connector assembly to said first cable at a second streamer cable location, and connecting by means of said second connector assembly at least one electrical power conductor and at least one data conductor included in said first cable to a connector for attachment to a second streamer cable;

extending at least one strength member, at least one power conductor and at least one data conductor continuously past said first connector assembly to at least said second connector assembly;

wherein said first connector assembly comprises a mounting assembly affixed to said at least one strength member, a connector housing affixed to said mounting assembly, and a swivel connector in pivotal engagement with said housing; and wherein said mounting assembly comprises a button affixed to said at least one strength member, a stress anchor assembled around said button, and a compression collar positioned in compressive engagement around said stress anchor.

* * * * *